United States Patent
Chen et al.

(10) Patent No.: US 11,835,685 B2
(45) Date of Patent: Dec. 5, 2023

(54) CAMERA OPTICAL LENS

(71) Applicant: AAC Optics Solutions Pte. Ltd., Singapore (SG)

(72) Inventors: Jia Chen, Shenzhen (CN); Wen Sun, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 426 days.

(21) Appl. No.: 17/008,679

(22) Filed: Sep. 1, 2020

(65) Prior Publication Data
US 2022/0003966 A1 Jan. 6, 2022

(30) Foreign Application Priority Data
Jul. 2, 2020 (CN) .......................... 202010624418.5

(51) Int. Cl.
*G02B 13/00* (2006.01)
*G02B 27/00* (2006.01)
*G02B 9/64* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/04; G02B 13/18; G02B 2003/0093; G02B 27/00; G02B 3/02; G02B 3/10
See application file for complete search history.

(56) References Cited

U.S. PATENT DOCUMENTS

| | | | |
|---|---|---|---|
| 5,404,246 A * | 4/1995 | Kaneko | G02B 9/62 |
| | | | 359/713 |
| 2015/0316748 A1* | 11/2015 | Cheo | G02B 7/005 |
| | | | 359/694 |
| 2017/0212334 A1* | 7/2017 | Imaoka | G02B 13/08 |
| 2020/0057258 A1* | 2/2020 | Oinuma | G02B 7/10 |
| 2022/0003962 A1* | 1/2022 | Sun | G02B 13/18 |

FOREIGN PATENT DOCUMENTS

CN 108873253 A * 11/2018 ......... G02B 13/0045

* cited by examiner

*Primary Examiner* — Wyatt A Stoffa
*Assistant Examiner* — Ray Alexander Dean
(74) *Attorney, Agent, or Firm* — W&G Law Group

(57) ABSTRACT

Provided is a camera optical lens including, sequentially from an object side to an image side: a first lens having a negative refractive power; a second lens; a third lens having a positive refractive power; a fourth lens having a negative refractive power; a fifth lens; a sixth lens having a positive refractive power; and a seventh lens having a negative refractive power. At least one of the first to seventh lenses comprises a free-form surface. The camera optical lens can achieve high optical performance while satisfying design requirements for ultra-thin, wide-angle lenses.

8 Claims, 8 Drawing Sheets

CAMERA OPTICAL LENS

TECHNICAL FIELD

The present invention relates to the field of optical lens, and more particularly, to a camera optical lens suitable for handheld terminal devices, such as smart phones or digital cameras, and camera devices, such as monitors or PC lenses.

BACKGROUND

With the development of imaging lenses, requirements on imaging of the lenses have become increasingly higher. The features of "night scene photography" and "background blurring" of the lenses have also become important indicators for measuring the imaging standards of the lenses. At present, rotationally symmetric aspheric surfaces are commonly used. Such aspheric surfaces only have sufficient degrees of freedom in the meridian plane, and cannot correct off-axis aberrations effectively. In addition, the existing structures have insufficient refractive power distributions, lens spacings and lens shape settings, resulting in insufficient ultra-thin and wide-angle properties of the lenses. A free-form surface is a non-rotationally symmetric surface type, which can better balance aberrations and improve imaging quality. The manufacture of free-form surfaces has gradually matured. As the requirements on the imaging of the lens increase, it is very important to add free-form surfaces when designing the lens, especially in the design of wide-angle and ultra-wide-angle lenses.

SUMMARY

In view of the problems, the present invention aims to provide a camera optical lens, which can achieve high optical performance while satisfying requirements for ultra-thin and wide-angle lenses.

In an embodiment, the present invention provides a camera optical lens. The camera optical lens includes, sequentially from an object side to an image side: a first lens having a negative refractive power; a second lens; a third lens having a positive refractive power; a fourth lens having a negative refractive power; a fifth lens; a sixth lens having a positive refractive power; and a seventh lens having a negative refractive power. At least one of the first to seventh lenses comprises a free-form surface.

As an improvement, the camera optical lens satisfies following conditions: $-6.45 \leq f1/f \leq -0.91$; $-3.75 \leq (R1+R2)/(R1-R2) \leq 0.55$; and $0.03 \leq d1/TTL \leq 0.17$, where f denotes a focal length of the camera optical lens; f1 denotes a focal length of the first lens; R1 denotes a curvature radius of an object side surface of the first lens; R2 denotes a curvature radius of an image side surface of the first lens; d1 denotes an on-axis thickness of the first lens; and TTL denotes a total optical length from the object side surface of the first lens to an image plane of the camera optical lens along an optic axis.

As an improvement, the camera optical lens satisfies following conditions: $-33.96 \leq f2/f \leq 7.32$; $-14.62 \leq (R3+R4)/(R3-R4) \leq 150.24$; and $0.02 \leq d3/TTL \leq 0.11$, where f denotes a focal length of the camera optical lens; f2 denotes a focal length of the second lens; R3 denotes a curvature radius of an object side surface of the second lens; R4 denotes a curvature radius of an image side surface of the second lens; d3 denotes an on-axis thickness of the second lens; and TTL denotes a total optical length from an object side surface of the first lens to an image plane of the camera optical lens along an optic axis.

As an improvement, the camera optical lens satisfies following conditions: $0.46 \leq f3/f \leq 1.95$; $-0.20 \leq (R5+R6)/(R5-R6) \leq 0.26$; and $0.05 \leq d5/TTL \leq 0.20$, where f denotes a focal length of the camera optical lens; f3 denotes a focal length of the third lens; R5 denotes a curvature radius of an object side surface of the third lens; R6 denotes a curvature radius of an image side surface of the third lens; d5 denotes an on-axis thickness of the third lens; and TTL denotes a total optical length from an object side surface of the first lens to an image plane of the camera optical lens along an optic axis.

As an improvement, the camera optical lens satisfies following conditions: $-7.29 \leq f4/f \leq -1.13$; $0.29 \leq (R7+R8)/(R7-R8) \leq 2.26$; and $0.02 \leq d7/TTL \leq 0.07$, where f denotes a focal length of the camera optical lens; f4 denotes a focal length of the fourth lens; R7 denotes a curvature radius of an object side surface of the fourth lens; R8 denotes a curvature radius of an image side surface of the fourth lens; d7 denotes an on-axis thickness of the fourth lens; and TTL denotes a total optical length from an object side surface of the first lens to an image plane of the camera optical lens along an optic axis.

As an improvement, the camera optical lens satisfies following conditions: $-231.01 \leq f5/f \leq 6.79$; $-230.02 \leq (R9+R10)/(R9-R10) \leq 2.75$; and $0.03 \leq d9/TTL \leq 0.15$, where f denotes a focal length of the camera optical lens; f5 denotes a focal length of the fifth lens; R9 denotes a curvature radius of an object side surface of the fifth lens; R10 denotes a curvature radius of an image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens satisfies following conditions: $0.47 \leq f6/f \leq 2.18$; $0.45 \leq (R11+R12)/(R11-R12) \leq 2.53$; and $0.05 \leq d11/TTL \leq 0.18$, where f denotes a focal length of the camera optical lens; f6 denotes a focal length of the sixth lens; R11 denotes a curvature radius of an object side surface of the sixth lens; R12 denotes a curvature radius of an image side surface of the sixth lens; d11 denotes an on-axis thickness of the sixth lens; and TTL denotes a total optical length from an object side surface of the first lens to an image plane of the camera optical lens along an optic axis.

As an improvement, the camera optical lens satisfies following conditions: $-4.66 \leq f7/f \leq -1.07$; $0.97 \leq (R13+R14)/(R13-R14) \leq 5.69$; and $0.03 \leq d13/TTL \leq 0.24$, where f denotes a focal length of the camera optical lens; f7 denotes a focal length of the seventh lens; R13 denotes a curvature radius of an object side surface of the seventh lens; R14 denotes a curvature radius of an image side surface of the seventh lens; d13 denotes an on-axis thickness of the seventh lens; and TTL denotes a total optical length from an object side surface of the first lens to an image plane of the camera optical lens along an optic axis.

As an improvement, the camera optical lens satisfies following conditions: $Fno \leq 2.06$, where Fno denotes an F number of the camera optical lens.

As an improvement, the camera optical lens satisfies following conditions: $TTL \leq 6.71$ mm, where TTL denotes a total optical length from an object side surface of the first lens to an image plane of the camera optical lens along an optic axis.

The present invention has advantageous effects in that the camera optical lens according to the present invention has excellent optical performance, is ultra-thin, wide-angle and includes, among the first lens to the seventh lens, at least one lens that includes a free-form surface, which can effectively correct aberrations while further improving the performance of the optical system, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figure and the embodiments. It should be understood the specific embodiments described hereby is only to explain the disclosure, not intended to limit the disclosure.

Embodiment 1

Figure 1:
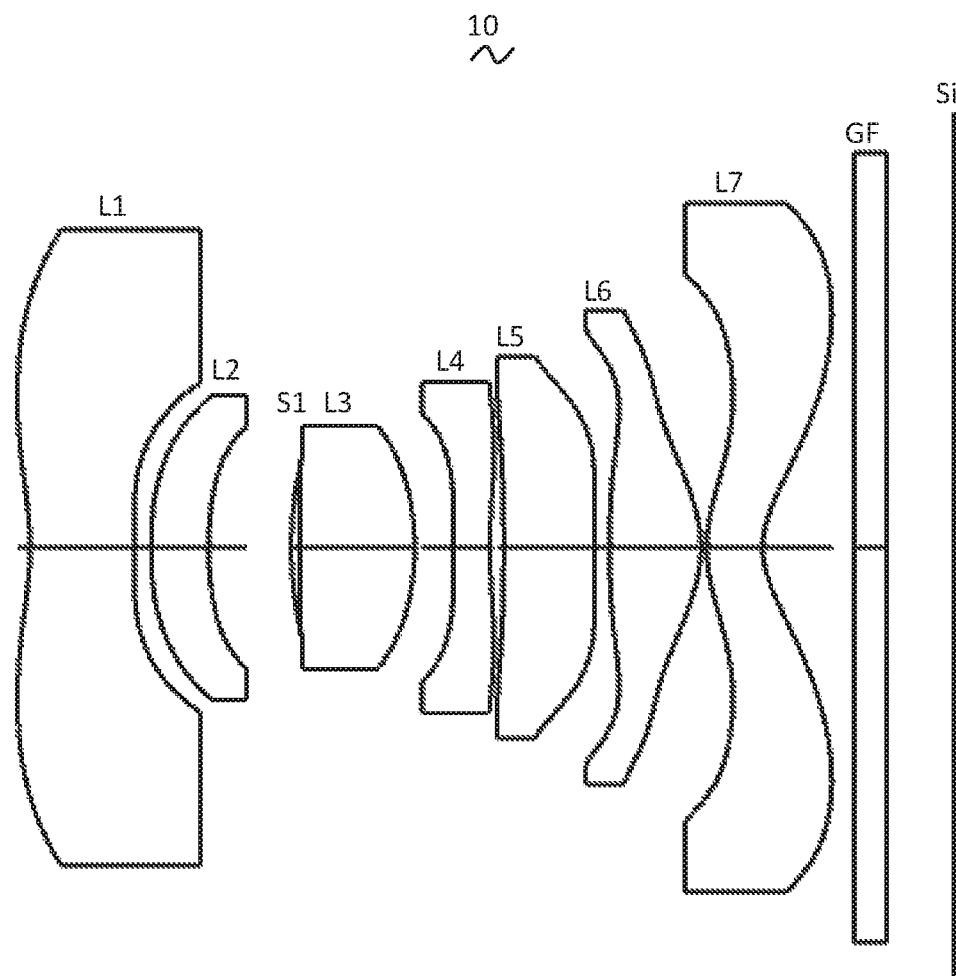
FIG. 1 is a schematic diagram of a structure of a camera optical lens in accordance with Embodiment 1 of the present invention.

Referring to FIG. 1, the present invention provides a camera optical lens 10. FIG. 1 shows the camera optical lens 10 according to Embodiment 1 of the present invention. The camera optical lens 10 includes seven lenses. Specifically, the camera optical lens 10 includes, sequentially from an object side to an image side, a first lens L1, a second lens L2, an aperture S1, a third lens L3, a fourth lens L4, a fifth lens L5, a sixth lens L6, and a seventh lens L7. An optical element such as a glass filter (GF) can be arranged between the seventh lens L7 and an image plane Si.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, and the seventh lens L7 is made of a plastic material. In other embodiments, the lenses may be made of other material.

In this embodiment, the first lens L1 has a negative refractive power, the third lens L3 has a positive refractive power, and the fourth lens L4 has a negative refractive power.

At least one of the first lens L1 to the seventh lens L7 includes a free-form surface. This can effectively correct aberrations while further improving the performance of the optical system.

In this embodiment, the first lens L1 has a negative refractive power, and includes an object side surface being concave in a paraxial region and an image side surface being convex in the paraxial region.

A focal length of the camera optical lens 10 is defined as f, and a focal length of the first lens L1 is defined as f1. The camera optical lens 10 should satisfy a condition of $-6.45 \leq f1/f \leq -0.91$, which specifies a ratio of the focal length of the first lens L1 to the focal length of the camera optical lens 10. When the condition is satisfied, the first lens has an appropriate negative refractive power, which can facilitate reducing aberrations of the system while facilitating a development towards ultra-thin, wide-angle lenses. As an example, $-4.03 \leq f1/f \leq -1.14$.

A curvature radius of the object side surface of the first lens L1 is defined as R1, and a curvature radius of the image side surface of the first lens L1 is defined as R2. The camera optical lens 10 should satisfy a condition of $-3.75 \leq (R1+R2)/(R1-R2) \leq 0.55$. By reasonably controlling a shape of the first lens L1, the first lens L1 can effectively correct spherical aberrations of the system. As an example, $-2.34 \leq (R1+R2)/(R1-R2) \leq 0.44$.

An on-axis thickness of the first lens L1 is defined as d1, and a total optical length from the object side surface of the first lens L1 to an image plane of the camera optical lens 10 along an optic axis is defined as TTL. The camera optical lens 10 should satisfy a condition of $0.03 \leq d1/TTL \leq 0.17$. This can facilitate achieving ultra-thin lenses. As an example, $0.04 \leq d1/TTL \leq 0.14$.

In an embodiment, the second lens L2 has a negative refractive power, and includes an object side surface being convex in a paraxial region and an image side surface being concave in the paraxial region.

The focal length of the camera optical lens 10 is f, and a focal length of the second lens L2 is f2. The camera optical lens 10 further satisfies a condition of $-33.96 \leq f2/f \leq 7.32$. By controlling the refractive power of the second lens L2 within the reasonable range, correction of aberrations of the optical system can be facilitated. As an example, $-21.22 \leq f2/f \leq 5.85$.

A curvature radius of the object side surface of the second lens L2 is defined as R3, and a curvature radius of the image side surface of the second lens L2 is defined as R4. The camera optical lens 10 should satisfy a condition of $-14.62 \leq (R3+R4)/(R3-R4) \leq 15.24$, which specifies a shape of the second lens L2. This can facilitate correction of an on-axis aberration with development towards ultra-thin, wide-angle lenses. As an example, $-9.14 \leq (R3+R4)/(R3-R4) \leq 12.19$.

An on-axis thickness of the second lens L2 is defined as d3, and the total optical length from the object side surface of the first lens L1 to the image plane of the camera optical lens 10 along the optic axis is defined as TTL. The camera optical lens 10 should satisfy a condition of $0.02 \leq d3/$ TTL≤0.11. This can facilitate achieving ultra-thin lenses. As an example, 0.04≤d3/TTL≤0.09.

In an embodiment, the third lens L3 has a positive refractive power, and includes an object side surface being convex in the paraxial region and an image side surface being convex in the paraxial region.

The focal length of the camera optical lens 10 is f, and a focal length of the third lens L3 is f3. The camera optical lens 10 further satisfies a condition of 0.46≤f3/f≤1.95. The appropriate distribution of the refractive power leads to better imaging quality and a lower sensitivity. As an example, 0.74≤f3/f≤1.56.

A curvature radius of the object side surface of the third lens L3 is defined as R5, and a curvature radius of the image side surface of the third lens L3 is defined as R6. The camera optical lens 10 should satisfy a condition of −0.20≤(R5+R6)/(R5−R6)≤0.26. This specifies a shape of the third lens. When the condition is satisfied, the deflection of light passing through the lens can be alleviated, and aberrations can be effectively reduced. As an example, −0.12≤(R5+R6)/(R5−R6)≤0.21.

An on-axis thickness of the third lens L3 is defined as d5, and the total optical length from the object side surface of the first lens L1 to the image plane of the camera optical lens 10 along the optic axis is defined as TTL. The camera optical lens 10 should satisfy a condition of 0.05≤d5/TTL≤0.20. This can facilitate achieving ultra-thin lenses. As an example, 0.08≤d5/TTL≤0.16.

In an embodiment, the fourth lens L4 has a negative refractive power, includes an object side surface being is convex in a paraxial region and an image side surface being concave in the paraxial region.

The focal length of the camera optical lens 10 is f, and a focal length of the fourth lens L4 is f4. The camera optical lens 10 further satisfies a condition of −7.29≤f4/f≤−1.13, which specifies a ratio of the focal length of the fourth lens L4 to the focal length of the camera optical lens. This facilitates improving the performance of the optical system. As an example, −4.56≤f4/f≤−1.42.

A curvature radius of the object side surface of the fourth lens L4 is defined as R7, and a curvature radius of the image side surface of the fourth lens L4 is defined as R8. The camera optical lens 10 should satisfy a condition of 0.29≤(R7+R8)/(R7−R8)≤2.26, which specifies a shape of the fourth lens L4. This can facilitate correction of an off-axis aberration with development towards ultra-thin, wide-angle lenses. As an example, 0.46≤(R7+R8)/(R7−R8)≤1.81.

An on-axis thickness of the fourth lens L4 is defined as d7, and the total optical length from the object side surface of the first lens L1 to the image plane of the camera optical lens 10 along the optic axis is defined as TTL. The camera optical lens 10 should satisfy a condition of 0.02≤d7/TTL≤0.07. This can facilitate achieving ultra-thin lenses. As an example, 0.03≤d7/TTL≤0.06.

In an embodiment, the fifth lens L5 has a negative refractive power, and includes an object side surface being concave in a paraxial region and an image side surface being concave in the paraxial region.

The focal length of the camera optical lens 10 is f, and the focal length of the fifth lens L5 is f5. The camera optical lens 10 further satisfies a condition of −231.01≤f5/f≤6.79. This condition for the fifth lens L5 can effectively make a light angle of the camera optical lens 10 gentle and reduce the tolerance sensitivity. As an example, −144.38≤f5/f≤5.43.

A curvature radius of the object side surface of the fifth lens L5 is defined as R9, and a curvature radius of the image side surface of the fifth lens L5 is defined as R10. The camera optical lens 10 should satisfy a condition of −23.02≤(R9+R10)/(R9−R10)≤2.75, which specifies a shape of the fifth lens L5. This can facilitate correction of an off-axis aberration with development towards ultra-thin, wide-angle lenses. As an example, −14.39≤(R9+R10)/(R9−R10)≤2.20.

An on-axis thickness of the fifth lens L5 is defined as d9, and the total optical length from the object side surface of the first lens L1 to the image plane of the camera optical lens 10 along the optic axis is defined as TTL. The camera optical lens 10 should satisfy a condition of 0.03≤d9/TTL≤0.15. This can facilitate achieving ultra-thin lenses. As an example, 0.05≤d9/TTL≤0.12.

In an embodiment, the sixth lens L6 has a positive refractive power, and includes an object side surface being convex in a paraxial region and an image side surface being convex in the paraxial region.

The focal length of the camera optical lens 10 is f, and the focal length of the sixth lens L6 is f6. The camera optical lens 10 further satisfies a condition of 0.47≤f6/f≤2.18. The appropriate distribution of the refractive power leads to better imaging quality and a lower sensitivity. As an example, 0.75≤f6/f≤1.74.

A curvature radius of the object side surface of the sixth lens L6 is defined as R11, and a curvature radius of the image side surface of the sixth lens L6 is defined as R12. The camera optical lens 10 should satisfy a condition of 0.45≤(R11+R12)/(R11−R12)≤2.53, which specifies a shape of the sixth lens L6. This can facilitate correction of an off-axis aberration with development towards ultra-thin, wide-angle lenses. As an example, 0.72≤(R11+R12)/(R11−R12)≤2.03.

An on-axis thickness of the sixth lens L6 is defined as d11, and the total optical length from the object side surface of the first lens L1 to the image plane of the camera optical lens 10 along the optic axis is defined as TTL. The camera optical lens 10 should satisfy a condition of 0.05≤d11/TTL≤0.18. This can facilitate achieving ultra-thin lenses. As an example, 0.08≤d11/TTL≤0.15.

In an embodiment, the seventh lens L7 has a negative refractive power, and includes an object side surface being convex in a paraxial region and an image side surface being concave in the paraxial region.

The focal length of the camera optical lens 10 is f, and the focal length of the seventh lens L7 is f7. The camera optical lens 10 further satisfies a condition of −4.66≤f7/f≤−1.07. The appropriate distribution of the refractive power leads to better imaging quality and a lower sensitivity. As an example, −2.92≤f7/f≤−1.34.

A curvature radius of the object side surface of the seventh lens L7 is defined as R13, and a curvature radius of the image side surface of the seventh lens L7 is defined as R14. The camera optical lens 10 further satisfies a condition of 0.97≤(R13+R14)/(R13−R14)≤5.69, which specifies a shape of the seventh lens L7. This can facilitate correction of an off-axis aberration with development towards ultra-thin, wide-angle lenses. As an example, 1.55≤(R13+R14)/(R13−R14)≤4.55.

An on-axis thickness of the seventh lens L7 is defined as d13, and the total optical length from the object side surface of the first lens L1 to the image plane of the camera optical lens 10 along the optic axis is defined as TTL. The camera optical lens 10 should satisfy a condition of 0.03≤d13/TTL≤0.24. This can facilitate achieving ultra-thin lenses. As an example, 0.05≤d13/TTL≤0.20.

In this embodiment, an F number of the camera optical lens 10 is smaller than or equal to 2.06. The camera optical lens 10 has a large aperture and better imaging performance.

As an example, the F number of the camera optical lens 10 is smaller than or equal to 2.02.

In this embodiment, the total optical length TTL of the camera optical lens 10 is smaller than or equal to 6.71 mm, which is beneficial for achieving ultra-thin lenses. As an example, the total optical length TTL of the camera optical lens 10 is smaller than or equal to 6.41 mm.

When the above conditions are satisfied, the camera optical lens 10 will have high optical imaging performance, and at the same time, with the free-form surface, achieve matching between a designed image side surface region and an actually used region, which can improve image quality of the effective region to the maximum extent. With these characteristics, the camera optical lens 10 is especially suitable for high-pixel camera optical lens assembly of mobile phones and WEB camera optical lenses formed by imaging elements such as CCD and CMOS.

In the following, examples will be used to describe the camera optical lens 10 of the present invention. The symbols recorded in each example will be described as follows. The focal length, on-axis distance, and curvature radius are all in units of mm.

TTL: Optical length (the total optical length from the object side surface of the first lens L1 to the image plane Si of the camera optical lens along the optic axis) in mm.

F number (FNO): a ratio of an effective focal length of the camera optical lens to an entrance pupil diameter (ENPD) of the camera optical lens.

Table 1 and Table 2 show design data of the camera optical lens 10 according to Embodiment 1 of the present invention, in which the object side surface and the image side surface of the first lens L1 are each a free-form surface.

TABLE 1

|     | R       | d    |         | nd     |     | vd    |
|-----|---------|------|---------|--------|-----|-------|
| S1  | ∞       | d0=  | −1.766  |        |     |       |
| R1  | −2.057  | d1=  | 0.681   | nd1    | 1.5444 | v1 | 56.43 |
| R2  | −6.754  | d2=  | 0.111   |        |     |       |
| R3  | 3.604   | d3=  | 0.375   | nd2    | 1.6800 | v2 | 18.40 |
| R4  | 2.611   | d4=  | 0.540   |        |     |       |
| R5  | 2.726   | d5=  | 0.807   | nd3    | 1.5444 | v3 | 56.43 |
| R6  | −1.921  | d6=  | 0.253   |        |     |       |
| R7  | 25.076  | d7=  | 0.240   | nd4    | 1.6800 | v4 | 18.40 |
| R8  | 3.558   | d8=  | 0.089   |        |     |       |
| R9  | −15.659 | d9=  | 0.594   | nd5    | 1.5444 | v5 | 56.43 |
| R10 | 67.780  | d10= | 0.100   |        |     |       |
| R11 | 17.251  | d11= | 0.594   | nd6    | 1.5444 | v6 | 56.43 |
| R12 | −0.944  | d12= | 0.040   |        |     |       |
| R13 | 1.111   | d13= | 0.364   | nd7    | 1.6153 | v7 | 26.00 |
| R14 | 0.598   | d14= | 0.600   |        |     |       |
| R15 | ∞       | d15= | 0.210   | ndg    | 1.5168 | vg | 64.17 |
| R16 | ∞       | d16= | 0.441   |        |     |       |

In the table, meanings of various symbols will be described as follows.

S1: aperture;
R: central curvature radius for a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of the object side surface of the seventh lens L7;
R14: curvature radius of the image side surface of the seventh lens L7;
R15: curvature radius of an object side surface of the optical filter GF;
R16: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF.

Table 2 shows aspheric surface data of respective lens in the camera optical lens 10 according to Embodiment 1 of the present invention.

TABLE 2

| | Conic coefficient | Aspherical surface coefficients | | | | |
|---|---|---|---|---|---|---|
| | k | A4 | A6 | A8 | A10 | A12 |
| R3 | 6.2811E+00 | 5.5749E−01 | −1.8613E+00 | 6.1738E+00 | −1.5530E+01 | 2.7089E+01 |
| R4 | −5.3718E+00 | 2.0993E−01 | −3.6418E−01 | 3.0661E+00 | −1.3581E+01 | 3.9753E+01 |
| R5 | −9.4335E+00 | 7.9344E−02 | 3.2910E−02 | −4.2277E−01 | 1.0415E+00 | −1.3142E+00 |
| R6 | 2.7355E+00 | −5.1055E−02 | 1.9010E−02 | 7.0099E−01 | −3.8479E+00 | 1.1883E+01 |
| R7 | −1.0000E+01 | −4.0457E−01 | 4.7044E−01 | −1.3287E+00 | 3.5190E+00 | −7.2428E+00 |
| R8 | −1.0000E+01 | −2.3998E−01 | 1.1446E−01 | 4.5016E−01 | −1.4219E+00 | 2.0833E+00 |
| R9 | 1.0000E+01 | 2.6706E−02 | −4.4587E−01 | 1.6802E+00 | −3.2003E+00 | 3.4971E+00 |
| R10 | −1.0000E+01 | 8.7437E−02 | −7.8323E−01 | 1.4094E+00 | −2.0789E+00 | 2.3329E+00 |
| R11 | −1.0000E+01 | 3.4885E−01 | −9.2965E−01 | 1.5160E+00 | −1.8103E+00 | 1.4867E+00 |
| R12 | −7.5694E−01 | 5.2861E−01 | −8.2059E−01 | 1.5080E+00 | −1.7418E+00 | 1.2440E+00 |
| R13 | −2.0337E+00 | −3.5947E−01 | 1.5586E−01 | 4.3583E−02 | −9.7529E−02 | 6.0023E−02 |
| R14 | −3.0471E+00 | −2.0755E−01 | 1.4519E−01 | −6.8336E−02 | 2.0886E−02 | −3.9368E−03 |

| | Conic coefficient | Aspherical surface coefficients | | | |
|---|---|---|---|---|---|
| | k | A14 | A16 | A18 | A20 |
| R3 | 6.2811E+00 | −3.1060E+01 | 2.2217E+01 | −8.9423E+00 | 1.5345E+00 |
| R4 | −5.3718E+00 | −7.4372E+01 | 8.6066E+01 | −5.5855E+01 | 1.5450E+01 |
| R5 | −9.4335E+00 | 4.1388E−01 | 0.0000E+00 | 0.0000E+00 | 0.0000E+00 |
| R6 | 2.7355E+00 | −2.3025E+01 | 2.7161E+01 | −1.7639E+01 | 4.7749E+00 |
| R7 | −1.0000E+01 | 1.0436E+01 | −1.0160E+01 | 5.8898E+00 | −1.4905E+00 |
| R8 | −1.0000E+01 | −1.8030E+00 | 9.5428E−01 | −2.9024E−01 | 3.9360E−02 |
| R9 | 1.0000E+01 | −2.2100E+00 | 7.5552E−01 | −1.0892E−01 | 0.0000E+00 |
| R10 | −1.0000E+01 | −1.7434E+00 | 7.9801E−01 | −1.9966E−01 | 2.0749E−02 |
| R11 | −1.0000E+01 | −8.1001E−01 | 2.7574E−01 | −5.2360E−02 | 4.2010E−03 |
| R12 | −7.5694E−01 | −5.6394E−01 | 1.5891E−01 | −2.5347E−02 | 1.7440E−03 |
| R13 | −2.0337E+00 | −2.0372E−02 | 4.0028E−03 | −4.2133E−04 | 1.8233E−05 |
| R14 | −3.0471E+00 | 3.8016E−04 | −2.0139E−06 | −2.9537E−06 | 1.8702E−07 |

$$z=(cr^2)/\{1+[1-(k+1)(c^2r^2)]^{1/2}\}+A4x^4+A6x^6+A8x^8+A10x^{10}+A12x^{12}+A14x^{14}+A16x^{16}+A18x^{18}+A20x^{20} \quad (1),$$

where k is a conic coefficient, A4, A6, A8, A10, A12, A14, A16, A18 and A20 are aspheric surface coefficients, c denotes a central curvature radius of an optical surface, r denotes a normal distance between a point on an aspheric surface curve to the optic axis, and z denotes a depth of the aspheric surface (a normal distance between a point on the aspherical surface, having a distance of r from the optic axis, and a surface tangent to a vertex of the aspherical surface on the optic axis).

In the present embodiment, an aspheric surface of each lens surface uses the aspheric surfaces shown in the above condition (1). However, the present invention is not limited to the aspherical polynomial form shown in the condition (1).

Table 3 shows data of free-form surfaces of the camera optical lens 10 according to Embodiment 1 of the present invention.

TABLE 3

| Free-form surface coefficients | | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −2.0000E+01 | 1.0071E−01 | 2.0180E−01 | 1.0115E−01 | −6.0031E−02 | −1.8021E−01 | −1.8076E−01 | −6.0603E−02 |
| R2 | 1.0000E+01 | 9.3669E−01 | 1.8757E+00 | 9.3883E−01 | −2.1360E+00 | −6.4169E+00 | −6.4176E+00 | −2.1448E+00 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | −7.9283E−02 | −3.9623E−02 | −7.9265E−03 | 1.5701E−03 | 9.4217E−03 | 2.3545E−02 | 3.1382E−02 | 2.3565E−02 |
| R2 | −1.0266E+02 | −5.1372E+01 | −1.0263E+01 | 1.3944E+01 | 8.3687E+01 | 2.0918E+02 | 2.7899E+02 | 2.0926E+02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | −1.3696E−03 | −1.9522E−04 | 1.3751E−05 | 1.0984E−04 | 3.8522E−04 | 7.7261E−04 | 9.6232E−04 | 7.6645E−04 |
| R2 | −8.6199E+01 | −1.2316E+01 | 6.6886E+00 | 5.3499E+01 | 1.8722E+02 | 3.7462E+02 | 4.6789E+02 | 3.7464E+02 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | −5.0611E−05 | −3.3588E−05 | −1.7416E−05 | −4.5644E−06 | −5.9617E−07 | 0.0000E+00 | 0.0000E+00 | 0.0000E+00 |
| R2 | −2.5188E+02 | −1.6846E+02 | −7.1642E+01 | −1.8083E+01 | −2.0004E+00 | 2.4778E−01 | 2.4758E+00 | 1.1189E+01 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | 2.6504E−02 | 1.0595E−01 | 1.5905E−01 | 1.0653E−01 | 2.6742E−02 | −7.9194E−03 | −3.9572E−02 | −7.9067E−02 |
| R2 | 5.2462E+00 | 2.1015E+01 | 3.1505E+01 | 2.1018E+01 | 5.2601E+00 | −1.0259E+01 | −5.1344E+01 | −1.0268E+02 |

TABLE 3-continued

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 9.3438E−03 | 1.5558E−03 | −1.9567E−04 | −1.3703E−03 | −4.1175E−03 | −6.8550E−03 | −6.8522E−03 | −4.0981E−03 |
| R2 | 8.3732E+01 | 1.3932E+01 | −1.2320E+01 | −8.6239E+01 | −2.5858E+02 | −4.3122E+02 | −4.3108E+02 | −2.5885E+02 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 3.9066E−04 | 1.1845E−04 | 1.4774E−05 | −4.1029E−07 | −3.6553E−06 | −1.4644E−05 | −3.4081E−05 | −5.2091E−05 |
| R2 | 1.8716E+02 | 5.3454E+01 | 6.6972E+00 | −1.9998E+00 | −1.7991E+01 | −7.2067E+01 | −1.6824E+02 | −2.5210E+02 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 2.9881E+01 | 5.2248E+01 | 6.2538E+01 | 5.2194E+01 | 2.9994E+01 | 1.0991E+01 | 2.5551E+00 | 2.4379E−01 |

$$Z = \frac{cr^2}{1+\sqrt{1-(1+k)c^2r^2}} + \sum_{i=1}^{N} B_i E_i(x, y), \quad (2)$$

where k is a conic coefficient, Bi denotes aspheric surface coefficients, r denotes a normal distance between a point on an aspheric surface curve to the optic axis, x denotes a x direction component of r, y denotes a y direction component of r, and z denotes a depth of the aspheric surface (a normal distance between a point on the aspherical surface, having a distance of r from the optic axis, and a surface tangent to a vertex of the aspherical surface on the optic axis).

For sake of explanation, each free-form surface adopts an extended polynomial form indicated in the above equation (2), however, the present invention is not limited thereto.

Figure 2:
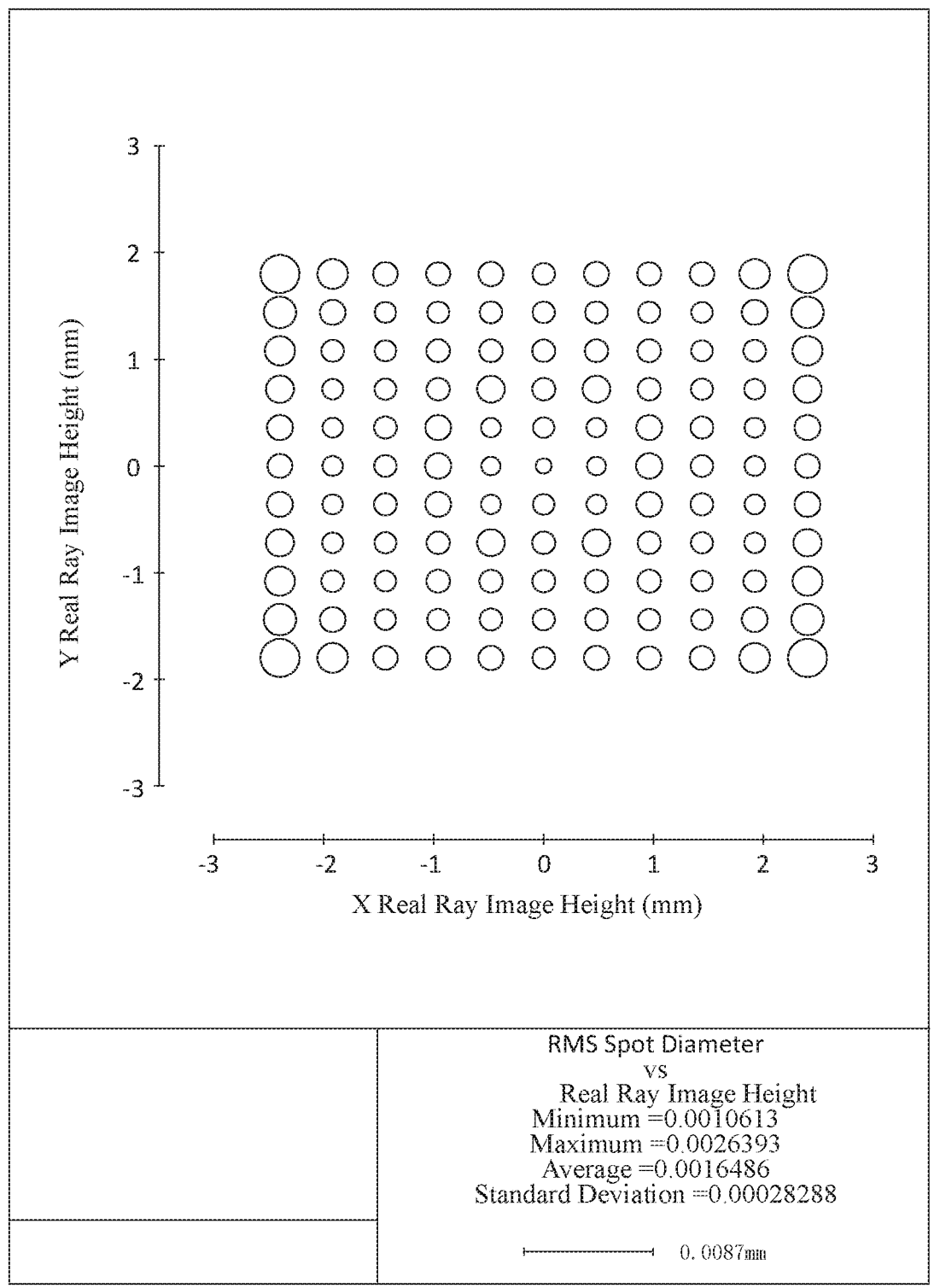
FIG. 2 illustrates a case where an RMS spot diameter of the camera optical lens shown in FIG. 1 is in a first quadrant.

FIG. 2 illustrates a case where an RMS spot diameter of the camera optical lens 10 according to Embodiment 1 is in a first quadrant. It can be seen from FIG. 2 that the camera optical lens 10 according to Embodiment 1 can achieve excellent imaging quality.

Table 13 below lists various values of Embodiments 1, 2, 3 and 4 and values corresponding to parameters which are specified in the above conditions.

As shown in Table 13, Embodiment 1 satisfies the respective conditions.

In this embodiment, the entrance pupil diameter of the camera optical lens is 0.908 mm. A full-field image height of the camera optical lens (along a diagonal direction) is 6.000 mm, an image height along the x direction of the camera optical lens is 4.800 mm, and an image height along the y direction of the camera optical lens is 3.600 mm. In such rectangular range, the best imaging effect can be achieved. A FOV (field of view) along a diagonal direction is 120.00°, a FOV along the x direction is 107.36°, and a FOV along the y direction is 90.83°. Thus, the camera optical lens 10 can satisfy design requirements for ultra-thin, wide-angle lenses while having on-axis and off-axis aberrations sufficiently corrected, thereby leading to better optical characteristics.

Embodiment 2

Embodiment 2 is basically the same as Embodiment 1 and involves symbols having the same meanings as Embodiment 1, and only differences from Embodiment 1 will be described below.

Figure 3:
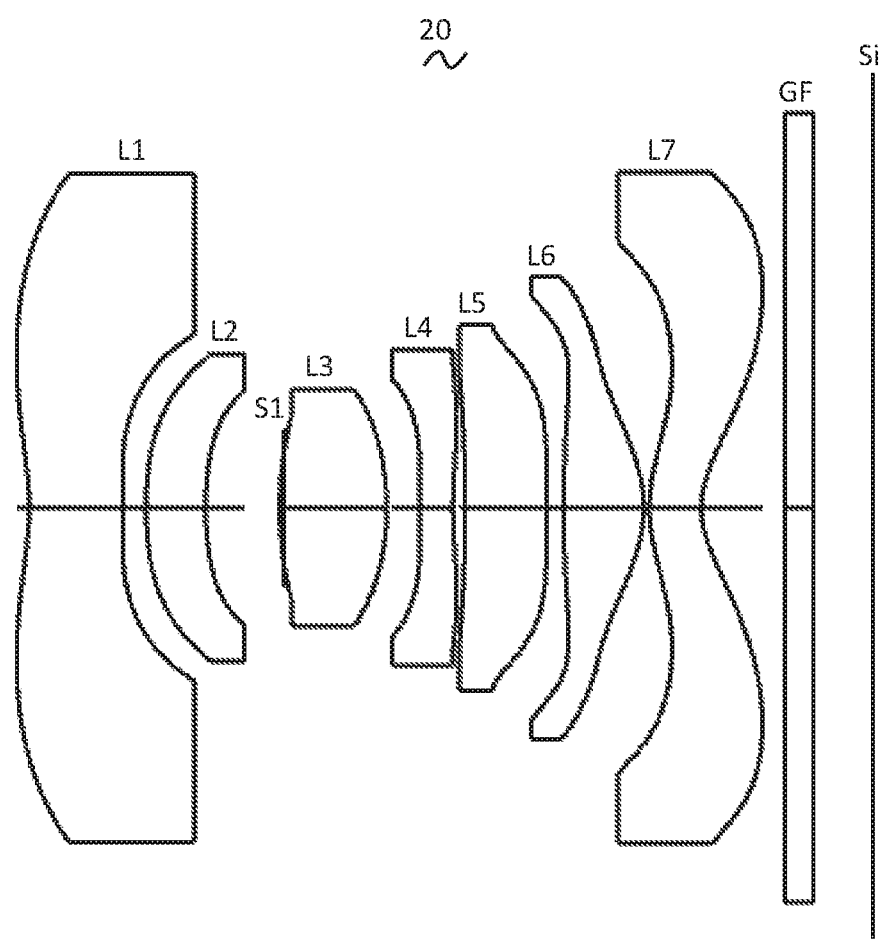
FIG. 3 is a schematic diagram of a structure of a camera optical lens in accordance with Embodiment 2 of the present invention.

FIG. 3 is a schematic diagram of a structure of a camera optical lens 20 in accordance with Embodiment 2 of the present invention. In this embodiment, the image side surface of the fifth lens L5 is convex in the paraxial region and the object side surface of the sixth lens L6 is concave in the paraxial region.

Table 4 and Table 5 show design data of the camera optical lens 20 according to Embodiment 2 of the present invention, in which the object side surface and the image side surface of the sixth lens L6 are each a free-form surface.

TABLE 4

| | R | d | | nd | | vd | |
|---|---|---|---|---|---|---|---|
| S1 | ∞ | d0= | −1.843 | | | | |
| R1 | −2.089 | d1= | 0.676 | nd1 | 1.5444 | v1 | 56.43 |
| R2 | −8.403 | d2= | 0.170 | | | | |
| R3 | 3.075 | d3= | 0.430 | nd2 | 1.6800 | v2 | 18.40 |
| R4 | 2.524 | d4= | 0.535 | | | | |
| R5 | 2.762 | d5= | 0.772 | nd3 | 1.5444 | v3 | 56.43 |
| R6 | −2.086 | d6= | 0.241 | | | | |
| R7 | 17.329 | d7= | 0.240 | nd4 | 1.6800 | v4 | 18.40 |
| R8 | 3.509 | d8= | 0.086 | | | | |
| R9 | −16.676 | d9= | 0.590 | nd5 | 1.5444 | v5 | 56.43 |
| R10 | −19.849 | d10= | 0.128 | | | | |
| R11 | −83.582 | d11= | 0.574 | nd6 | 1.5444 | v6 | 56.43 |
| R12 | −0.930 | d12= | 0.040 | | | | |
| R13 | 1.133 | d13= | 0.375 | nd7 | 1.6153 | v7 | 26.00 |
| R14 | 0.603 | d14= | 0.600 | | | | |
| R15 | ∞ | d15= | 0.210 | ndg | 1.5168 | vg | 64.17 |
| R16 | ∞ | d16= | 0.434 | | | | |

Table 5 shows aspheric surface data of respective lenses in the camera optical lens 20 according to Embodiment 2 of the present invention.

TABLE 5

| | Conic coefficient | Aspherical surface coefficients | | | | |
|---|---|---|---|---|---|---|
| | k | A4 | A6 | A8 | A10 | A12 |
| R1 | −1.9580E+01 | 9.3697E−02 | −5.5573E−02 | 2.4447E−02 | −7.3576E−03 | 1.4799E−03 |
| R2 | 1.0000E+01 | 7.1861E−01 | −1.4456E+00 | 3.2569E+00 | −5.9713E+00 | 7.6770E+00 |
| R3 | 5.4880E+00 | 3.9314E−01 | −1.2172E+00 | 4.0011E+00 | −1.0209E+01 | 1.8132E+01 |
| R4 | −2.6527E+00 | 1.8917E−01 | 1.5173E−02 | −3.2165E−01 | 3.2234E+00 | −1.0263E+01 |
| R5 | −4.8743E+00 | 5.7391E−02 | 2.3798E−03 | −5.5266E−02 | 0.0000E+00 | 0.0000E+00 |
| R6 | 2.7635E+00 | −8.5037E−02 | 1.5749E−01 | −1.7535E−01 | 8.5866E−02 | −1.2827E−02 |
| R7 | 1.0000E+01 | −4.4159E−01 | 5.4349E−01 | −1.3668E+00 | 3.7664E+00 | −8.9062E+00 |
| R8 | −9.9252E+00 | −2.7629E−01 | 1.3136E−01 | 6.1454E−01 | −1.7070E+00 | 2.0653E+00 |

TABLE 5-continued

| | | | | | | |
|---|---|---|---|---|---|---|
| R9  | 1.0000E+01  | 1.9623E−02  | −4.9824E−01 | 1.8455E+00  | −3.1510E+00 | 2.7244E+00  |
| R10 | −1.0000E+01 | 7.0642E−02  | −7.0919E−01 | 1.3709E+00  | −1.9968E+00 | 2.0575E+00  |
| R13 | −1.9036E+00 | −4.0838E−01 | 3.0502E−01  | −1.6426E−01 | 5.6466E−02  | −7.5316E−03 |
| R14 | −3.2272E+00 | −1.7752E−01 | 1.2129E−01  | −6.3444E−02 | 2.3544E−02  | −5.8904E−03 |

| | Conic coefficient | Aspherical surface coefficients | | | |
|---|---|---|---|---|---|
| | k | A14 | A16 | A18 | A20 |
| R1  | −1.9580E+01 | −1.8792E−04 | 1.3488E−05  | −4.1309E−07 | 0.0000E+00  |
| R2  | 1.0000E+01  | −6.4536E+00 | 3.3465E+00  | −9.5930E−01 | 1.1468E−01  |
| R3  | 5.4880E+00  | −2.1103E+01 | 1.5192E+01  | −6.0735E+00 | 1.0178E+00  |
| R4  | −2.6527E+00 | 1.6785E+01  | −1.3353E+01 | 4.0340E+00  | 0.0000E+00  |
| R5  | −4.8743E+00 | 0.0000E+00  | 0.0000E+00  | 0.0000E+00  | 0.0000E+00  |
| R6  | 2.7635E+00  | 0.0000E+00  | 0.0000E+00  | 0.0000E+00  | 0.0000E+00  |
| R7  | 1.0000E+01  | 1.4912E+01  | −1.6263E+01 | 1.0130E+01  | −2.6585E+00 |
| R8  | −9.9252E+00 | −1.3463E+00 | 4.6360E−01  | −6.6306E−02 | 0.0000E+00  |
| R9  | 1.0000E+01  | −9.6996E−01 | −1.5360E−01 | 2.2039E−01  | −4.7944E−02 |
| R10 | −1.0000E+01 | −1.3727E+00 | 5.4301E−01  | −1.0845E−01 | 7.3712E−03  |
| R13 | −1.9036E+00 | −2.3110E−03 | 1.1285E−03  | −1.7221E−04 | 9.2096E−06  |
| R14 | −3.2272E+00 | 9.2798E−04  | −8.2852E−05 | 3.2264E−06  | −5.0147E−09 |

Table 6 shows data of free-form surfaces of the camera optical lens 20 according to Embodiment 2 of the present invention.

TABLE 6

| | Free-form surface coefficients | | | | | | |
|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R11 | −1.0000E+01 | 3.2711E−01 | 6.5270E−01 | 3.2593E−01 | −9.2321E−01 | −2.7668E+00 | −2.7656E+00 | −9.2192E−01 |
| R12 | −7.5747E−01 | 4.9534E−01 | 9.8933E−01 | 4.9414E−01 | −7.4769E−01 | −2.2414E+00 | −2.2404E+00 | −7.4675E−01 |

| $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|
| R11 | −2.0728E+01 | −1.0364E+01 | −2.0738E+00 | 1.7601E+00 | 1.0562E+01 | 2.6407E+01 | 3.5209E+01 | 2.6408E+01 |
| R12 | −1.4526E+01 | −7.2636E+00 | −1.4534E+00 | 1.0095E+00 | 6.0578E+00 | 1.5144E+01 | 2.0192E+01 | 1.5148E+01 |

| $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|
| R11 | −6.9069E+00 | −9.8610E−01 | 3.4404E−01 | 2.7516E+00 | 9.6318E+00 | 1.9262E+01 | 2.4077E+01 | 1.9261E+01 |
| R12 | −3.2079E+00 | −4.5816E−01 | 1.3248E−01 | 1.0596E+00 | 3.7087E+00 | 7.4181E+00 | 9.2717E+00 | 7.4176E+00 |

| $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|
| R11 | −8.4021E+00 | −5.6033E+00 | −2.3987E+00 | −5.9866E−01 | −6.6791E−02 | 5.4322E−03 | 5.4534E−02 | 2.4499E−01 |
| R12 | −2.7688E+00 | −1.8456E+00 | −7.9184E−01 | −1.9731E−01 | −2.1962E−02 | 1.5759E−03 | 1.5838E−02 | 7.1155E−02 |

| $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|
| R11 | 1.6507E+00 | 6.5958E+00 | 9.8999E+00 | 6.5946E+00 | 1.6499E+00 | −2.0734E+00 | −1.0361E+01 | −2.0736E+01 |
| R12 | 1.3204E+00 | 5.2785E+00 | 7.9186E+00 | 5.2773E+00 | 1.3200E+00 | −1.4530E+00 | −7.2631E+00 | −1.4530E+01 |

| $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|
| R11 | 1.0563E+01 | 1.7605E+00 | −9.8643E−01 | −6.9065E+00 | −2.0717E+01 | −3.4528E+01 | −3.4524E+01 | −2.0717E+01 |
| R12 | 6.0565E+00 | 1.0099E+00 | −4.5827E−01 | −3.2083E+00 | −9.6241E+00 | −1.6040E+01 | −1.6042E+01 | −9.6251E+00 |

| $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|
| R11 | 9.6278E+00 | 2.7522E+00 | 3.4391E−01 | −6.6660E−02 | −5.9989E−01 | −2.4000E+00 | −5.5994E+00 | −8.3989E+00 |
| R12 | 3.7073E+00 | 1.0602E+00 | 1.3230E−01 | −2.1972E−02 | −1.9781E−01 | −7.9113E−01 | −1.8461E+00 | −2.7699E+00 |

| $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|
| R11 | 6.5406E−01 | 1.1423E+00 | 1.3737E+00 | 1.1460E+00 | 6.5585E−01 | 2.4471E−01 | 5.3867E−02 | 5.4768E−03 |
| R12 | 1.8969E−01 | 3.3237E−01 | 3.9844E−01 | 3.3226E−01 | 1.8981E−01 | 7.1600E−02 | 1.5500E−02 | 1.5861E−03 |

Figure 4:
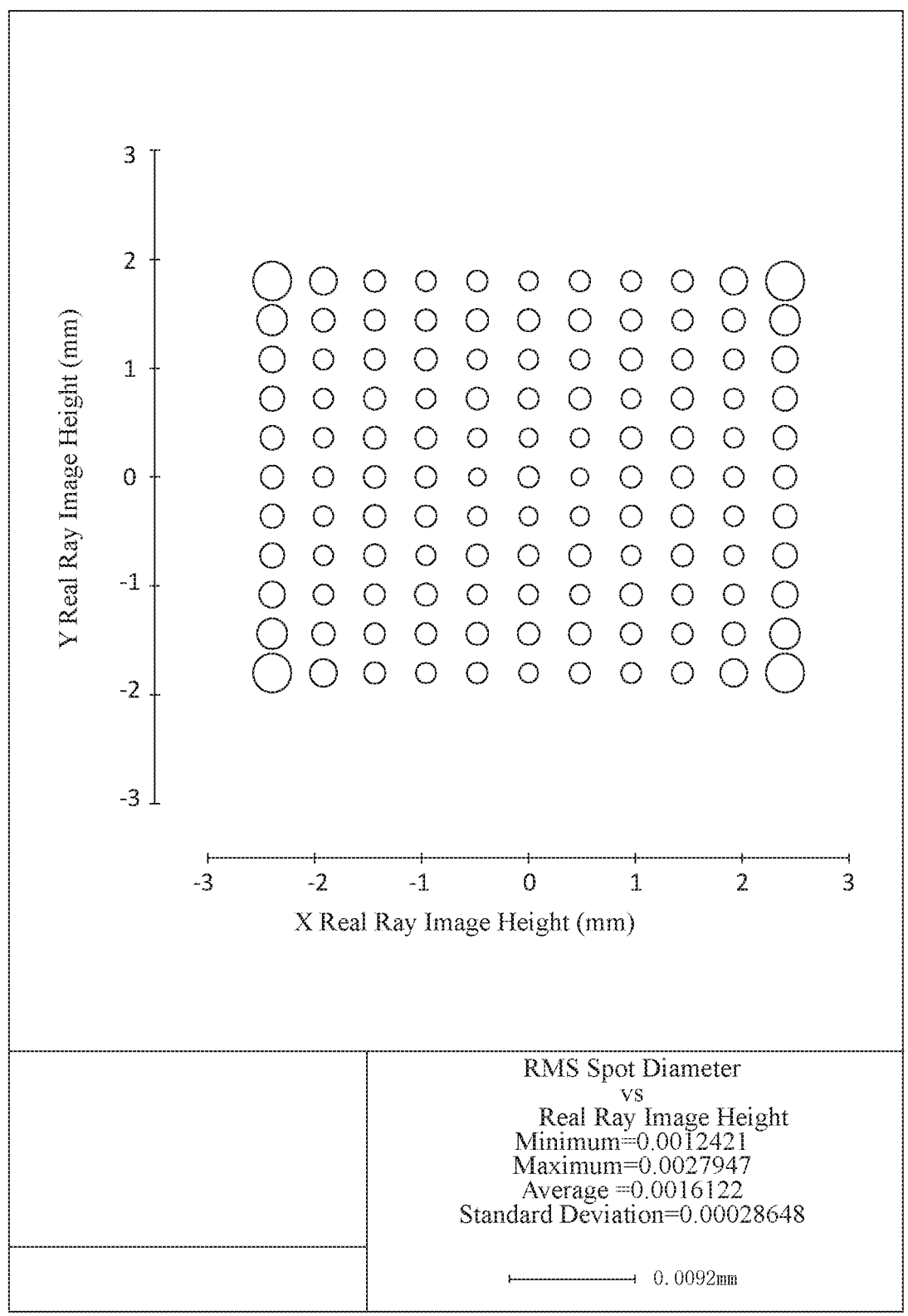
FIG. 4 illustrates a case where an RMS spot diameter of the camera optical lens shown in FIG. 3 is in a first quadrant.

FIG. 4 illustrates a case where an RMS spot diameter of the camera optical lens 20 according to Embodiment 2 is in a first quadrant. It can be seen from FIG. 4 that the camera optical lens 20 according to Embodiment 2 can achieve excellent imaging quality.

As shown in Table 13, Embodiment 2 satisfies the respective conditions.

In this embodiment, the entrance pupil diameter of the camera optical lens is 0.908 mm. A full-field image height of the camera optical lens (along a diagonal direction) is 6.000 mm, an image height along the x direction of the camera optical lens is 4.800 mm, and an image height along the y direction of the camera optical lens is 3.600 mm. In such rectangular range, the best imaging effect can be achieved. A FOV (field of view) along a diagonal direction is 120.00°, a FOV along the x direction is 107.08°, and a FOV along the y direction is 90.54°. Thus, the camera optical lens 20 can satisfy design requirements for ultra-thin, wide-angle lenses while having on-axis and off-axis aberrations sufficiently corrected, thereby leading to better optical characteristics.

Embodiment 3

Embodiment 3 is basically the same as Embodiment 1 and involves symbols having the same meanings as Embodiment 1, and only differences from Embodiment 1 will be described below.

Figure 5:
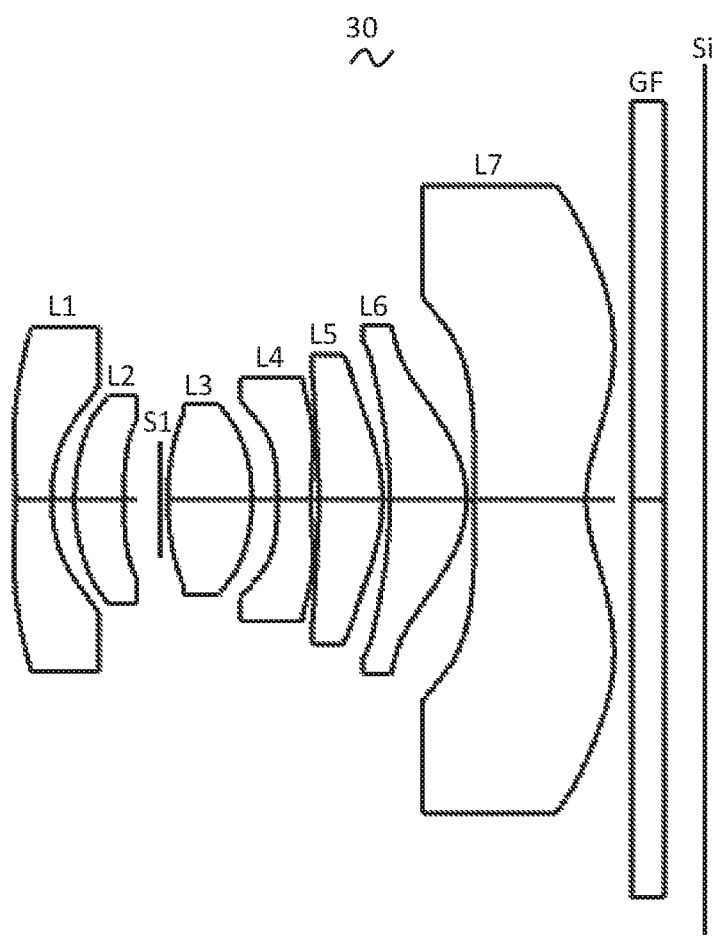
FIG. 5 is a schematic diagram of a structure of a camera optical lens in accordance with Embodiment 3 of the present invention.

FIG. 5 is a schematic diagram of a structure of a camera optical lens 30 in accordance with Embodiment 3 of the present invention. In this embodiment, the second lens L2 has a positive refractive power, the fifth lens L5 has a positive refractive power, the image side surface of the first lens L1 is concave in the paraxial region, the object side surface of fourth lens L4 is concave in the paraxial region, the image side surface of the fifth lens L5 is convex in the paraxial region, and the object side surface of the sixth lens L6 is concave in the paraxial region.

Table 7 and Table 8 show design data of the camera optical lens 30 according to Embodiment 3 of the present invention, in which the object side surface and the image side surface of the second lens L2 are each a free-form surface.

TABLE 7

|     | R      | d    |        | nd   |     | vd   |       |
|-----|--------|------|--------|------|-----|------|-------|
| S1  | ∞      | d0=  | −0.949 |      |     |      |       |
| R1  | −3.196 | d1=  | 0.240  | nd1  | 1.5444 | v1  | 55.82 |
| R2  | 1.475  | d2=  | 0.150  |      |     |      |       |
| R3  | 1.494  | d3=  | 0.321  | nd2  | 1.6400 | v2  | 23.54 |
| R4  | 3.651  | d4=  | 0.290  |      |     |      |       |
| R5  | 2.068  | d5=  | 0.549  | nd3  | 1.5450 | v3  | 55.81 |
| R6  | −1.578 | d6=  | 0.166  |      |     |      |       |
| R7  | −8.149 | d7=  | 0.222  | nd4  | 1.6613 | v4  | 20.37 |
| R8  | 2.129  | d8=  | 0.051  |      |     |      |       |
| R9  | −4.214 | d9=  | 0.417  | nd5  | 1.5450 | v5  | 55.81 |
| R10 | −1.240 | d10= | 0.050  |      |     |      |       |
| R11 | −3.286 | d11= | 0.501  | nd6  | 1.5450 | v6  | 55.81 |
| R12 | −0.842 | d12= | 0.049  |      |     |      |       |
| R13 | 2.968  | d13= | 0.735  | nd7  | 1.5444 | v7  | 55.82 |
| R14 | 0.947  | d14= | 0.303  |      |     |      |       |
| R15 | ∞      | d15= | 0.210  | ndg  | 1.5168 | vg  | 64.17 |
| R16 | ∞      | d16= | 0.269  |      |     |      |       |

Table 8 shows aspheric surface data of respective lenses in the camera optical lens 30 according to Embodiment 3 of the present invention.

TABLE 8

|     | Conic coefficient | Aspherical surface coefficients | | | | |
|-----|-----|-----|-----|-----|-----|-----|
|     | k | A4 | A6 | A8 | A10 | A12 |
| R1  | −2.0269E+02 | 3.3868E−01  | −4.8766E−01 | 4.7969E−01  | −3.2925E−01 | 1.4862E−01  |
| R2  | 5.8971E−01  | 7.2529E−01  | −1.1181E+00 | 2.4630E−01  | 1.9670E+00  | −5.1522E+00 |
| R5  | 3.0506E+00  | 1.0294E−01  | −2.2869E−01 | −2.7075E−02 | 1.0356E+00  | 6.3532E−01  |
| R6  | 2.8717E+00  | −3.5718E−01 | 1.0725E−01  | −8.8031E−02 | 4.8982E−01  | 1.5800E+00  |
| R7  | 1.0524E+02  | −1.6902E+00 | 3.4654E+00  | −1.9859E+01 | 1.0914E+02  | −4.2271E+02 |
| R8  | −3.5452E+01 | −9.4747E−01 | 3.1917E+00  | −1.2344E+01 | 3.2852E+01  | −5.6724E+01 |
| R9  | −9.8518E+02 | −3.4688E−01 | 2.5642E+00  | −1.1597E+01 | 3.2683E+01  | −5.8675E+01 |
| R10 | −9.0085E+00 | −1.2348E−01 | 6.2500E−02  | 1.1903E−01  | 4.4299E−02  | −4.8757E−02 |
| R11 | 4.5977E+00  | 5.7382E−02  | −2.7443E−02 | −1.4813E−02 | 4.4846E−02  | 3.8188E−02  |
| R12 | −6.3340E−01 | −1.4168E−01 | 1.5245E+00  | −3.8991E+00 | 7.3051E+00  | −9.2624E+00 |
| R13 | −2.6384E+03 | −2.3239E−01 | 3.1154E−01  | −1.6476E−01 | −2.9806E−01 | 6.5660E−01  |
| R14 | −4.9899E+00 | −2.4938E−01 | 2.1501E−01  | −1.6050E−01 | 8.6766E−02  | −3.1989E−02 |

|     | Conic coefficient | Aspherical surface coefficients | | | |
|-----|-----|-----|-----|-----|-----|
|     | k | A14 | A16 | A18 | A20 |
| R1  | −2.0269E+02 | −3.8455E−02 | 4.1391E−03  | −8.8892E−05 | 1.8692E−05  |
| R2  | 5.8971E−01  | 4.3442E+00  | −1.1103E+00 | 9.9473E−02  | −6.7030E−02 |
| R5  | 3.0506E+00  | −1.2388E+01 | 1.0339E+01  | 1.2105E+02  | −2.2505E+02 |
| R6  | 2.8717E+00  | 2.8874E+00  | −3.1915E+00 | −3.0536E+01 | 7.5441E+01  |
| R7  | 1.0524E+02  | 1.0993E+03  | −1.6852E+03 | 1.3083E+03  | −3.5868E+02 |
| R8  | −3.5452E+01 | 6.8416E+01  | −5.6579E+01 | 2.7887E+01  | −5.6250E+00 |
| R9  | −9.8518E+02 | 6.8716E+01  | −5.1751E+01 | 2.2633E+01  | −4.2799E+00 |
| R10 | −9.0085E+00 | −8.1660E−02 | −6.1456E−02 | −5.5516E−03 | 7.1341E−02  |
| R11 | 4.5977E+00  | −3.2306E−02 | −3.4225E−02 | 1.6088E−02  | −4.9774E−04 |
| R12 | −6.3340E−01 | 7.7315E+00  | −4.0206E+00 | 1.1662E+00  | −1.4276E−01 |
| R13 | −2.6384E+03 | −6.1497E−01 | 3.1528E−01  | −8.4158E−02 | 9.0919E−03  |
| R14 | −4.9899E+00 | 7.8696E−03  | −1.2317E−03 | 1.1005E−04  | −4.2424E−06 |

Table 9 shows data of free-form surfaces of the camera optical lens 30 according to Embodiment 3 of the present invention.

satisfy design requirements for ultra-thin, wide-angle lenses while having on-axis and off-axis aberrations sufficiently corrected, thereby leading to better optical characteristics.

TABLE 9

| | Free-form surface coefficients | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R3 | 1.0084E+00 | −3.7468E−02 | −7.4669E−02 | −3.7596E−02 | 1.9814E−01 | 5.8861E−01 | 5.9553E−01 | 1.9822E−01 |
| R4 | 2.4843E+01 | 2.1163E−02 | 4.5617E−02 | 2.1243E−02 | 1.7715E+00 | 5.3032E+00 | 5.3182E+00 | 1.7708E+00 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R3 | −2.0941E+00 | −1.0476E+00 | −2.0932E−01 | −2.0793E−01 | −1.2476E+00 | −3.1147E+00 | −4.1039E+00 | −3.1155E+00 |
| R4 | 6.0615E+01 | 3.0294E+01 | 6.1023E+00 | 2.1819E+01 | 1.3054E+02 | 3.2318E+02 | 4.3169E+02 | 3.2684E+02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R3 | 1.9634E+00 | 2.7308E−01 | 6.1998E−01 | 4.9669E+00 | 1.8793E+01 | 3.6120E+01 | 4.5050E+01 | 3.4990E+01 |
| R4 | −7.3202E+01 | −1.0268E+01 | −1.0345E+02 | −8.3172E+02 | −2.8481E+03 | −5.7355E+03 | −7.5229E+03 | −5.7536E+03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R3 | −5.5177E+01 | −3.6876E+01 | −1.5787E+01 | −3.5413E+00 | −4.8042E−01 | −3.8853E+00 | −3.8914E+01 | −1.6895E+02 |
| R4 | −1.7111E+04 | −1.1797E+04 | −5.1561E+03 | −1.3370E+03 | −1.4709E+02 | 8.5470E+02 | 8.5060E+03 | 3.9267E+04 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R3 | 2.1558E−01 | 8.5301E−01 | 1.2829E+00 | 8.6366E−01 | 2.1586E−01 | −2.0978E−01 | −1.0558E+00 | −2.1445E+00 |
| R4 | −4.4210E+00 | −1.7743E+01 | −2.6474E+01 | −1.7737E+01 | −4.4188E+00 | 6.0910E+00 | 3.0327E+01 | 6.0228E+01 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R3 | −1.2405E+00 | −2.0784E−01 | 2.7507E−01 | 1.9319E+00 | 6.1506E+00 | 9.9379E+00 | 9.8404E+00 | 5.7758E+00 |
| R4 | 1.3054E+02 | 2.1850E+01 | −1.0326E+01 | −7.3075E+01 | −2.2820E+02 | −3.8882E+02 | −3.7362E+02 | −2.1428E+02 |
| | $X^4Y^{12}$ | $X^2Y^{14}$ | $X^0Y^{16}$ | $Y^{18}Y^0$ | $X^{16}Y^2$ | $X^{14}Y^4$ | $X^{12}Y^6$ | $X^{10}Y^8$ |
| R3 | 1.7472E+01 | 5.1115E+00 | 6.1102E−01 | −4.5028E−01 | −4.0603E+00 | −1.2827E+01 | −3.4377E+01 | −5.7278E+01 |
| R4 | −2.8690E+03 | −8.3208E+02 | −1.0340E+02 | −1.4674E+02 | −1.3372E+03 | −5.0067E+03 | −1.0579E+04 | −1.7685E+04 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R3 | −4.4497E+02 | −8.2343E+02 | −9.4866E+02 | −8.0520E+02 | −4.6039E+02 | −1.7265E+02 | −3.7283E+01 | −3.9772E+00 |
| R4 | 1.1922E+05 | 1.9000E+05 | 2.1396E+05 | 1.9610E+05 | 1.0703E+05 | 3.8888E+04 | 8.4281E+03 | 8.5070E+02 |

Figure 6:
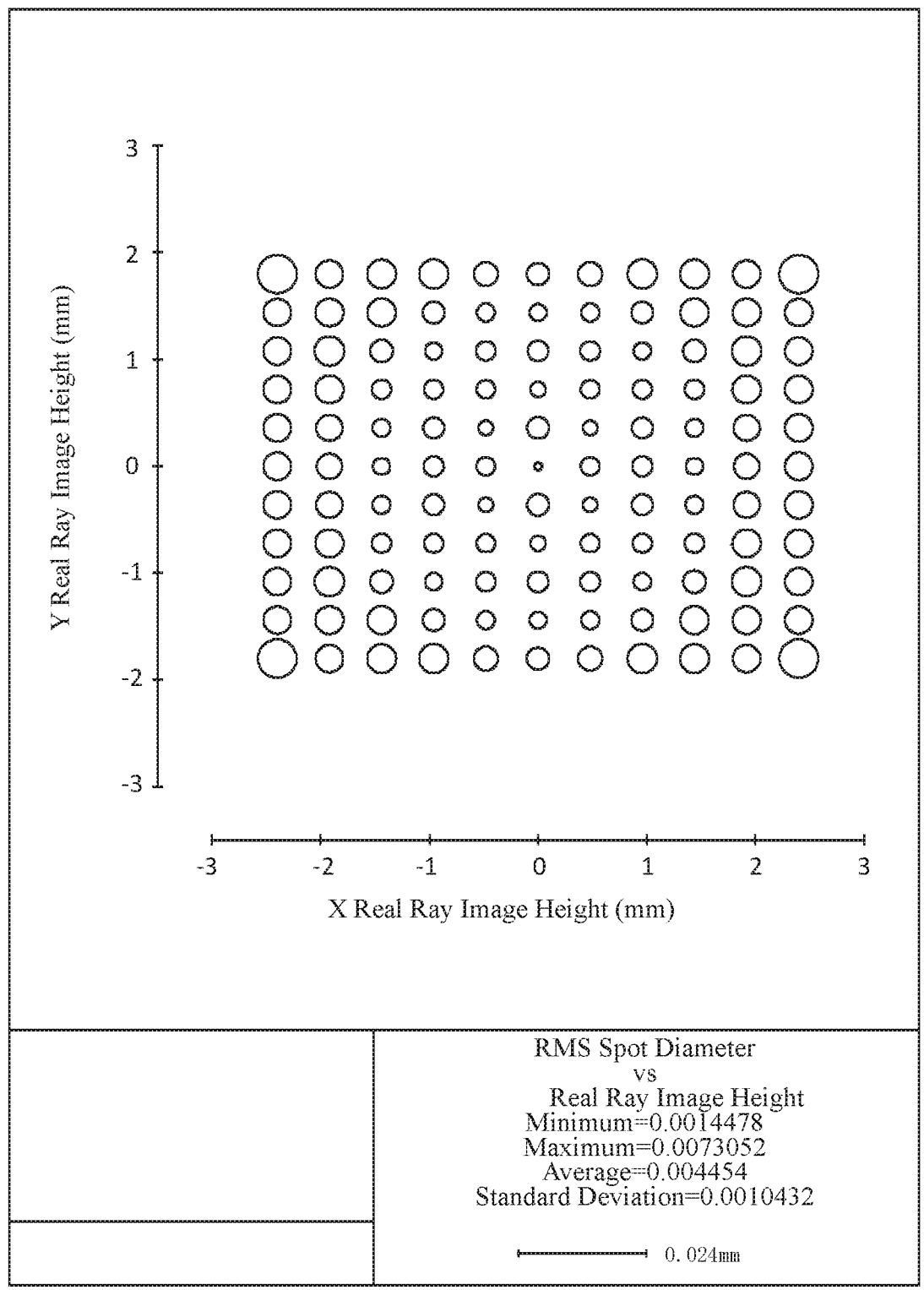
FIG. 6 illustrates a case where an RMS spot diameter of the camera optical lens shown in FIG. 5 is in a first quadrant.

FIG. 6 illustrates a case where an RMS spot diameter of the camera optical lens 30 according to Embodiment 3 is in a first quadrant. It can be seen from FIG. 6 that the camera optical lens 30 according to Embodiment 3 can achieve excellent imaging quality.

Table 13 below lists values corresponding to respective conditions in the present embodiment. The camera optical lens according to Embodiment 3 satisfies the respective conditions.

In this embodiment, the entrance pupil diameter of the camera optical lens is 0.664 mm. A full-field image height of the camera optical lens (along a diagonal direction) is 6.000 mm, an image height along the x direction of the camera optical lens is 4.800 mm, and an image height along the y direction of the camera optical lens is 3.600 mm. In such rectangular range, the best imaging effect can be achieved. A FOV (field of view) along a diagonal direction is 120.43°, a FOV along the x direction is 110.45°, and a FOV along the y direction is 98.99°. Thus, the camera optical lens 30 can Embodiment 4

Embodiment 4 is basically the same as Embodiment 1 and involves symbols having the same meanings as Embodiment 1, and only differences from Embodiment 1 will be described below.

Figure 7:
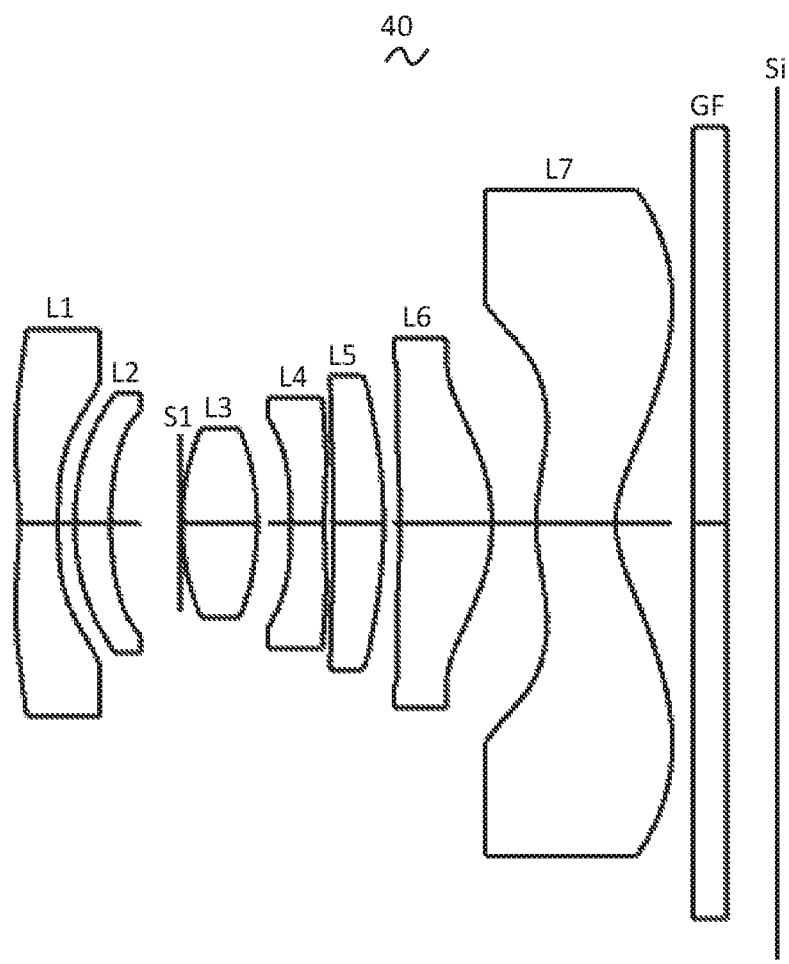
FIG. 7 is a schematic diagram of a structure of a camera optical lens in accordance with Embodiment 4 of the present invention.

FIG. 7 is a schematic diagram of a structure of a camera optical lens 40 in accordance with Embodiment 4 of the present invention. In this embodiment, the second lens L2 has a positive refractive power, the fifth lens L5 has a positive refractive power, the image side surface of the first lens L1 is concave in the paraxial region, the object side surface of fourth lens L4 is concave in the paraxial region, the image side surface of the fifth lens L5 is convex in the paraxial region, and the object side surface of the sixth lens L6 is concave in the paraxial region.

Table 10 and Table 11 show design data of the camera optical lens 40 according to Embodiment 4 of the present invention, in which the object side surface and the image side surface of the sixth lens L6 are each a free-form surface.

TABLE 10

|  | R |  | d |  | nd |  | vd |
|---|---|---|---|---|---|---|---|
| S1 | ∞ | d0= | -1.050 |  |  |  |  |
| R1 | -2.618 | d1= | 0.253 | nd1 | 1.5444 | v1 | 55.82 |
| R2 | 6.924 | d2= | 0.109 |  |  |  |  |
| R3 | 1.874 | d3= | 0.231 | nd2 | 1.6400 | v2 | 23.54 |
| R4 | 2.468 | d4= | 0.467 |  |  |  |  |
| R5 | 1.907 | d5= | 0.487 | nd3 | 1.5500 | v3 | 56.10 |
| R6 | -2.328 | d6= | 0.217 |  |  |  |  |
| R7 | -11.747 | d7= | 0.220 | nd4 | 1.6700 | v4 | 20.40 |
| R8 | 3.153 | d8= | 0.062 |  |  |  |  |
| R9 | -18.564 | d9= | 0.321 | nd5 | 1.5500 | v5 | 56.10 |
| R10 | -4.183 | d11= | 0.109 |  |  |  |  |

TABLE 10-continued

|  | R |  | d |  | nd |  | vd |
|---|---|---|---|---|---|---|---|
| R11 | -7.229 | d11= | 0.598 | nd6 | 1.5500 | v6 | 56.10 |
| R12 | -1.413 | d12= | 0.287 |  |  |  |  |
| R13 | 1.278 | d13= | 0.519 | nd7 | 1.5444 | v7 | 55.82 |
| R14 | 0.745 | d14= | 0.501 |  |  |  |  |
| R15 | ∞ | d15= | 0.221 | ndg | 1.5200 | vg | 64.20 |
| R16 | ∞ | d16= | 0.328 |  |  |  |  |

Table 11 shows aspheric surface data of respective lenses in the camera optical lens 40 according to Embodiment 4 of the present invention.

TABLE 11

|  | Conic coefficient | Aspherical surface coefficients | | | | |
|---|---|---|---|---|---|---|
|  | k | A4 | A6 | A8 | A10 | A12 |
| R1 | -4.4500E+01 | 2.9538E-01 | -3.7899E-01 | 3.3780E-01 | -2.1377E-01 | 8.6783E-02 |
| R2 | 1.8444E+01 | 6.5089E-01 | -7.5319E-01 | 2.4660E-01 | 1.3253E+00 | -2.9750E+00 |
| R3 | 1.5158E+00 | -1.0174E-02 | 9.2189E-02 | -1.9018E-03 | -6.2765E-02 | -6.1270E-02 |
| R4 | 5.1232E+00 | -5.6270E-02 | 3.9361E-01 | -1.7369E-01 | -2.8929E-01 | -8.9646E-02 |
| R5 | 2.6083E+00 | 2.5244E-02 | -2.4537E-01 | 2.0901E-01 | 7.7745E-01 | 6.2893E-01 |
| R6 | 6.4052E+00 | -1.1504E-01 | 2.0281E-01 | 3.8552E-02 | -2.1815E-01 | -1.7254E-01 |
| R7 | 1.8993E+02 | -9.1234E-01 | 2.7164E+00 | -1.4070E+01 | 6.9393E+01 | -2.4866E+02 |
| R8 | -4.8986E+01 | -6.6145E-01 | 2.4850E+00 | -8.7205E+00 | 2.1216E+01 | -3.3185E+01 |
| R9 | 3.9947E+02 | -3.1204E-01 | 2.0906E+00 | -8.2149E+00 | 2.1070E+01 | -3.4286E+01 |
| R10 | 5.7252E+00 | -2.3524E-02 | 5.2521E-02 | -2.7515E-03 | 2.9125E-03 | 5.9575E-03 |
| R13 | -1.0826E+01 | -3.4171E-01 | 2.8424E-01 | -1.1842E-01 | -1.9341E-01 | 3.8454E-01 |
| R14 | -3.9076E+00 | -1.8334E-01 | 1.6566E-01 | -1.1493E-01 | 5.5886E-02 | -1.8692E-02 |

|  | Conic coefficient | Aspherical surface coefficients | | | |
|---|---|---|---|---|---|
|  | k | A14 | A16 | A18 | A20 |
| R1 | -4.4500E+01 | -2.0222E-02 | 2.1339E-03 | 1.4791E-05 | -3.6228E-06 |
| R2 | 1.8444E+01 | 2.3063E+00 | -5.9338E-01 | -2.1919E-02 | 1.7634E-02 |
| R3 | 1.5158E+00 | -3.2619E-02 | -1.9838E-03 | 5.1048E-03 | -3.6735E-02 |
| R4 | 5.1232E+00 | 1.0420E+00 | 1.6281E+00 | 7.5858E-01 | -5.7452E+00 |
| R5 | 2.6083E+00 | -8.0967E+00 | -3.7238E+00 | 4.4837E+01 | -4.1212E+01 |
| R6 | 6.4052E+00 | 1.8032E+00 | 1.6531E+00 | -9.6105E+00 | 8.7258E+00 |
| R7 | 1.8993E+02 | 5.8271E+02 | -8.0731E+02 | 5.7967E+02 | -1.5833E+02 |
| R8 | -4.8986E+01 | 3.6152E+01 | -2.7454E+01 | 1.1987E+01 | -1.9142E+00 |
| R9 | 3.9947E+02 | 3.6453E+01 | -2.4951E+01 | 9.8667E+00 | -1.7674E+00 |
| R10 | 5.7252E+00 | -1.3850E-03 | -1.2250E-02 | -1.1912E-02 | -2.0324E-03 |
| R13 | -1.0826E+01 | -3.2599E-01 | 1.5168E-01 | -3.6718E-02 | 3.5785E-03 |
| R14 | -3.9076E+00 | 4.1764E-03 | -5.9211E-04 | 4.8015E-05 | -1.6935E-06 |

Table 12 shows data of free-form surfaces of the camera optical lens 40 according to Embodiment 4 of the present invention.

TABLE 12

| Free-form surface coefficients | | | | | | | | |
|---|---|---|---|---|---|---|---|---|
|  | k | $X^4Y^0$ | $X^2Y^2$ | $X^0Y^4$ | $X^6Y^0$ | $X^4Y^2$ | $X^2Y^4$ | $X^0Y^6$ |
| R11 | -1.1071E+02 | 4.1517E-02 | 8.2801E-02 | 4.1454E-02 | 5.3539E-04 | 2.5065E-04 | 2.1994E-03 | 8.5012E-04 |
| R12 | -3.5639E-01 | -2.2373E-01 | -4.5102E-01 | -2.2370E-01 | 1.1989E+00 | 3.5970E+00 | 3.5982E+00 | 1.1991E+00 |

|  | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R11 | 2.1062E-02 | 7.3906E-03 | 1.8553E-03 | -9.7935E-04 | -5.9372E-03 | -1.1465E-02 | -1.1307E-02 | -1.4437E-02 |
| R12 | 4.7067E+01 | 2.3533E+01 | 4.7067E+00 | -5.4166E+00 | -3.2500E+01 | -8.1248E+01 | -1.0833E+02 | -8.1250E+01 |

|  | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R11 | -5.1580E-02 | -7.2669E-03 | -9.9938E-04 | -8.0064E-03 | -2.1581E-02 | -3.7909E-02 | -5.8565E-02 | -6.0717E-02 |
| R12 | 2.8700E+01 | 4.1002E+00 | -1.9338E+00 | -1.5470E+01 | -5.4145E+01 | -1.0829E+02 | -1.3537E+02 | -1.0829E+02 |

TABLE 12-continued

|  | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R11 | 7.2808E−01 | 4.8182E−01 | 2.0863E−01 | 5.2514E−02 | 5.5448E−03 | −4.7238E−03 | −4.6976E−02 | −2.0924E−01 |
| R12 | 6.4120E+01 | 4.2746E+01 | 1.8320E+01 | 4.5797E+00 | 5.0894E−01 | −5.6605E−02 | −5.6593E−01 | −2.5469E+00 |

|  | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R11 | 7.0032E−04 | 2.4060E−03 | 5.2310E−03 | 3.2114E−03 | 1.0359E−03 | 1.6750E−03 | 8.2282E−03 | 1.7961E−02 |
| R12 | −2.7762E+00 | −1.1104E+01 | −1.6653E+01 | −1.1104E+01 | −2.7760E+00 | 4.7067E+00 | 2.3533E+01 | 4.7070E+01 |

|  | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R11 | −7.5596E−03 | −9.7732E−04 | −7.1392E−03 | −5.0344E−02 | −1.4469E−01 | −2.3695E−01 | −2.4520E−01 | −1.5396E−01 |
| R12 | −3.2500E+01 | −5.4174E+00 | 4.1000E+00 | 2.8700E+01 | 8.6100E+01 | 1.4350E+02 | 1.4350E+02 | 8.6099E+01 |

|  | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R11 | −3.1799E−02 | −8.7281E−03 | −1.1965E−03 | 5.8112E−03 | 5.2418E−02 | 2.1421E−01 | 5.0444E−01 | 7.4174E−01 |
| R12 | −5.4146E+01 | −1.5470E+01 | −1.9336E+00 | 5.0889E−01 | 4.5802E+00 | 1.8320E+01 | 4.2748E+01 | 6.4122E+01 |

|  | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R11 | −5.6070E−01 | −1.0162E+00 | −1.2070E+00 | −9.9693E−01 | −5.6595E−01 | −2.0705E−01 | −4.5972E−02 | −5.0564E−03 |
| R12 | −6.7914E+00 | −1.1882E+01 | −1.4263E+01 | −1.1888E+01 | −6.7934E+00 | −2.5482E+00 | −5.6656E−01 | −5.6536E−02 |

Figure 8:
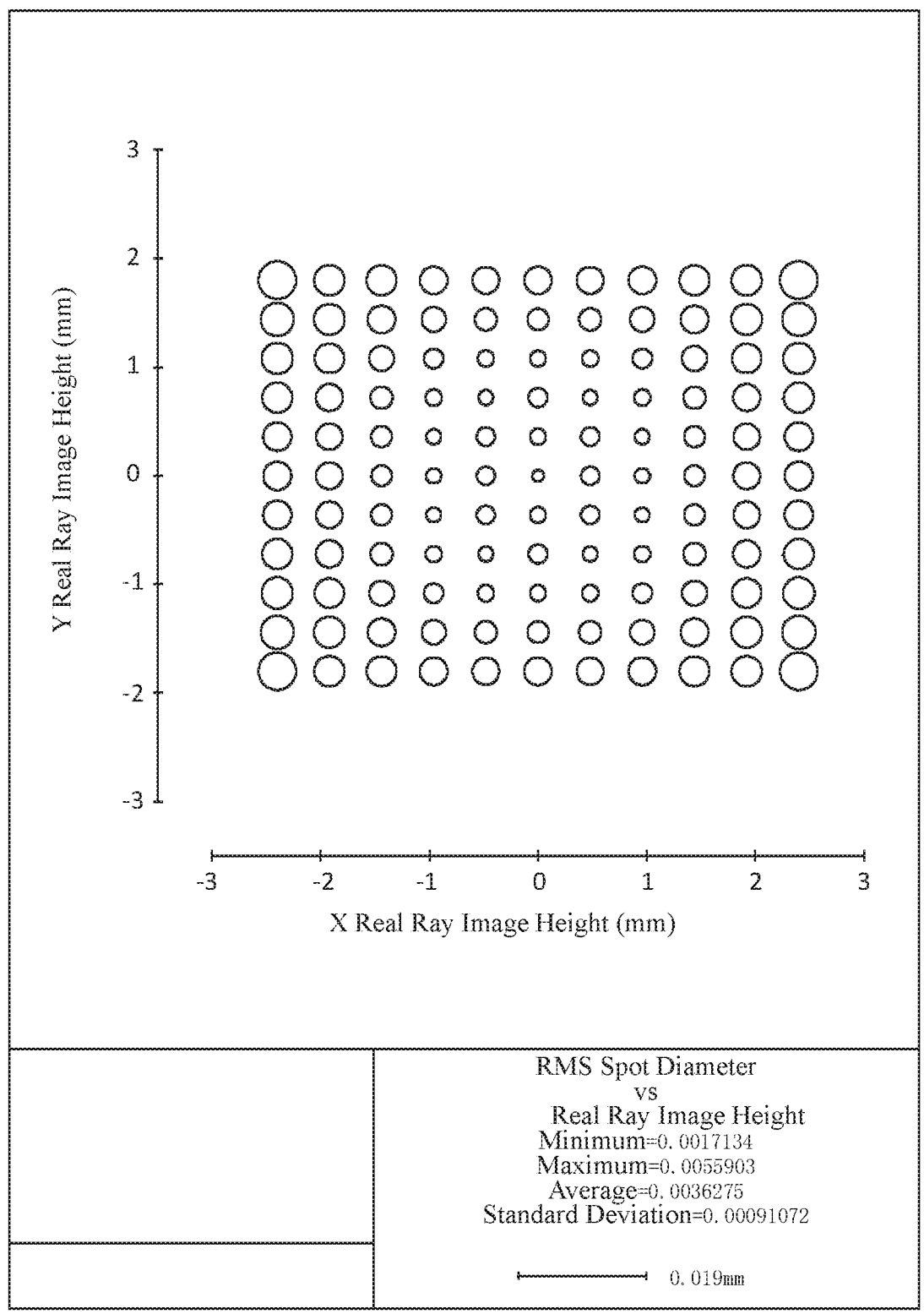
FIG. 8 illustrates a case where an RMS spot diameter of the camera optical lens shown in FIG. 7 is in a first quadrant.

FIG. 8 illustrates a case where an RMS spot diameter of the camera optical lens 40 according to Embodiment 4 is in a first quadrant. It can be seen from FIG. 8 that the camera optical lens 40 according to Embodiment 4 can achieve excellent imaging quality.

Table 13 below lists values corresponding to respective conditions in the present embodiment. The camera optical lens according to Embodiment 4 satisfies the respective conditions.

In this embodiment, the entrance pupil diameter of the camera optical lens is 1.071 mm. A full-field image height of the camera optical lens (along a diagonal direction) is 6.000 mm, an image height along the x direction of the camera optical lens is 4.800 mm, and an image height along the y direction of the camera optical lens is 3.600 mm. In such rectangular range, the best imaging effect can be achieved. A FOV (field of view) along a diagonal direction is 113.40°, a FOV along the x direction is 97.01°, and a FOV along the y direction is 79.46°. Thus, the camera optical lens 40 can satisfy design requirements for ultra-thin, wide-angle lenses while having on-axis and off-axis aberrations sufficiently corrected, thereby leading to better optical characteristics.

TABLE 13

| Parameters and Conditions | Embodiment 1 | Embodiment 2 | Embodiment 3 | Embodiment 4 |
|---|---|---|---|---|
| f | 1.770 | 1.770 | 1.327 | 2.142 |
| f1 | −5.71 | −5.29 | −1.81 | −3.44 |
| f2 | −16.296 | −30.051 | 3.696 | 10.448 |
| f3 | 2.20 | 2.31 | 1.73 | 1.98 |
| f4 | −6.07 | −6.45 | −2.50 | −3.65 |
| f5 | −23.231 | −204.445 | 3.060 | 9.700 |
| f6 | 1.658 | 1.718 | 1.929 | 3.067 |
| f7 | −2.877 | −2.853 | −2.917 | −4.996 |
| FNO | 1.95 | 1.95 | 2.00 | 2.00 |
| TTL | 6.039 | 6.101 | 4.523 | 4.930 |
| FOV | 120.00 | 120.00 | 120.43 | 113.40 |
| IH | 6.000 | 6.000 | 6.000 | 6.000 |

It can be appreciated by one having ordinary skill in the art that the description above is only embodiments of the present invention. In practice, one having ordinary skill in the art can make various modifications to these embodiments in forms and details without departing from the spirit and scope of the present invention.

What is claimed is:

1. A camera optical lens, comprising, sequentially from an object side to an image side:
   a first lens having a negative refractive power;
   a second lens;
   a third lens having a positive refractive power;
   a fourth lens having a negative refractive power;
   a fifth lens;
   a sixth lens having a positive refractive power; and
   a seventh lens having a negative refractive power,
   wherein at least one of the first to seventh lenses comprises a free-form surface;
   the camera optical lens satisfying following conditions:
   $-6.45 \leq f1/f \leq -0.91$;
   $-3.75 \leq (R1+R2)/(R1-R2) \leq 0.55$;
   $0.03 \leq d1/TTL \leq 0.17$;
   $0.46 \leq f3/f \leq 1.95$;
   $-0.20 \leq (R5+R6)/(R5-R6) \leq 0.26$; and
   $0.05 \leq d5/TTL \leq 0.20$,
   where
   f denotes a focal length of the camera optical lens;
   f1 denotes a focal length of the first lens;
   R1 denotes a curvature radius of an object side surface of the first lens;
   R2 denotes a curvature radius of an image side surface of the first lens;
   d1 denotes an on-axis thickness of the first lens;
   f3 denotes a focal length of the third lens;
   R5 denotes a curvature radius of an object side surface of the third lens;
   R6 denotes a curvature radius of an image side surface of the third lens;
   d5 denotes an on-axis thickness of the third lens; and
   TTL denotes a total optical length from the object side surface of the first lens to an image plane of the camera optical lens along an optic axis.

2. The camera optical lens as described in claim 1, satisfying following conditions:
   $-33.96 \leq f2/f \leq 7.32$;
   $-14.62 \leq (R3+R4)/(R3-R4) \leq 15.24$; and
   $0.02 \leq d3/TTL \leq 0.11$, where
f denotes a focal length of the camera optical lens;
f2 denotes a focal length of the second lens;
R3 denotes a curvature radius of an object side surface of the second lens;
R4 denotes a curvature radius of an image side surface of the second lens;
d3 denotes an on-axis thickness of the second lens; and
TTL denotes a total optical length from an object side surface of the first lens to an image plane of the camera optical lens along an optic axis.

3. The camera optical lens as described in claim 1, satisfying following conditions:
$-7.29 \leq f4/f \leq -1.13$;
$0.29 \leq (R7+R8)/(R7-R8) \leq 2.26$; and
$0.02 \leq d7/TTL \leq 0.07$,
where
f denotes a focal length of the camera optical lens;
f4 denotes a focal length of the fourth lens;
R7 denotes a curvature radius of an object side surface of the fourth lens;
R8 denotes a curvature radius of an image side surface of the fourth lens;
d7 denotes an on-axis thickness of the fourth lens; and
TTL denotes a total optical length from an object side surface of the first lens to an image plane of the camera optical lens along an optic axis.

4. The camera optical lens as described in claim 1, satisfying following conditions:
$-231.01 \leq f5/f \leq 6.79$;
$-23.02 \leq (R9+R10)/(R9-R10) \leq 2.75$; and
$0.03 \leq d9/TTL \leq 0.15$,
where
f denotes a focal length of the camera optical lens;
f5 denotes a focal length of the fifth lens;
R9 denotes a curvature radius of an object side surface of the fifth lens;
R10 denotes a curvature radius of an image side surface of the fifth lens;
d9 denotes an on-axis thickness of the fifth lens; and
TTL denotes a total optical length from an object side surface of the first lens to an image plane of the camera optical lens along an optic axis.

5. The camera optical lens as described in claim 1, satisfying following conditions:
$0.47 \leq f6/f \leq 2.18$;
$0.45 \leq (R11+R12)/(R11-R12) \leq 2.53$; and
$0.05 \leq d11/TTL \leq 0.18$,
where
f denotes a focal length of the camera optical lens;
f6 denotes a focal length of the sixth lens;
R11 denotes a curvature radius of an object side surface of the sixth lens;
R12 denotes a curvature radius of an image side surface of the sixth lens;
d11 denotes an on-axis thickness of the sixth lens; and
TTL denotes a total optical length from an object side surface of the first lens to an image plane of the camera optical lens along an optic axis.

6. The camera optical lens as described in claim 1, satisfying following conditions:
$-4.66 \leq f7/f \leq -1.07$;
$0.97 \leq (R13+R14)/(R13-R14) \leq 5.69$; and
$0.03 \leq d13/TTL \leq 0.24$,
where
f denotes a focal length of the camera optical lens;
f7 denotes a focal length of the seventh lens;
R13 denotes a curvature radius of an object side surface of the seventh lens;
R14 denotes a curvature radius of an image side surface of the seventh lens;
d13 denotes an on-axis thickness of the seventh lens; and
TTL denotes a total optical length from an object side surface of the first lens to an image plane of the camera optical lens along an optic axis.

7. The camera optical lens as described in claim 1, satisfying a following condition:
$Fno \leq 2.06$,
where
Fno denotes an F number of the camera optical lens.

8. The camera optical lens as described in claim 1, satisfying a following condition:
$TTL \leq 6.71$ mm,
where
TTL denotes a total optical length from an object side surface of the first lens to an image plane of the camera optical lens along an optic axis.

* * * * *